UNITED STATES PATENT OFFICE.

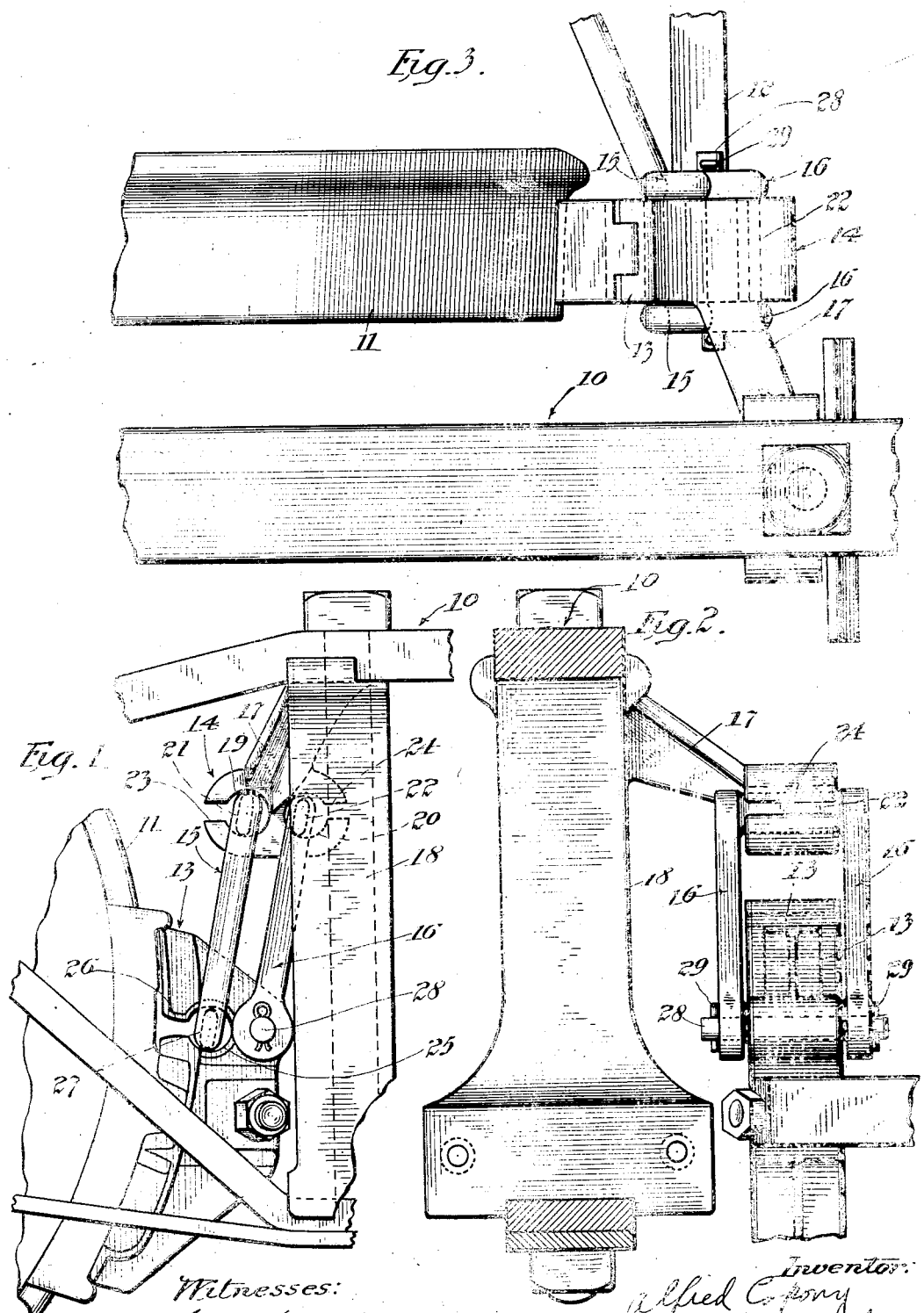

ALFRED COPONY, OF CHICAGO, ILLINOIS, ASSIGNOR OF ONE-HALF TO CHARLES R. COOPER, OF CHICAGO, ILLINOIS.

HANGER FOR RAILWAY-BRAKES.

1,309,353.     Specification of Letters Patent.     Patented July 8, 1919.

Application filed July 19, 1916. Serial No. 110,046.

*To all whom it may concern:*

Be it known that I, ALFRED COPONY, subject of the Emperor of Austria, residing at Chicago, in the county of Cook and State of Illinois, have invented new and useful Improvements in Hangers for Railway-Brakes, of which the following is a full, clear, concise, and exact description, reference being had to the accompanying drawing, forming a part of this specification.

My invention relates to hangers for railway brakes.

Among the objects of my invention is to provide an improved brake hanger easily assembled, safe, and in which the hanger guides the brake head in its movement.

Further objects will appear from the detailed description to follow taken in connection with the appended claim.

In the drawings in which one embodiment of my invention is shown

Figure 1 is a side elevation of part of a car truck showing the brake head and hanger;

Fig. 2 is a fragmentary sectional view looking from the right toward Fig. 1; and Fig. 3 is a plan view of the parts shown in Fig. 1.

Referring to the drawing in detail my invention is shown in connection with parts of a car comprising the truck frame 10, the car wheel 11 journaled in the truck frame, brake beam 12, the brake head 13 secured to the brake beam and the brake hanger 14 for supporting the brake head from the truck frame. The brake hanger 14 comprises two parallel loop shaped links 15—16 of equal length, each pivotally connected to a supporting bracket 17 and each pivotally connected to the brake head 13. The bracket 17 may be cast integral with the column casting 18. It is provided with two eyes 19 and 20 in which are journaled the pivot portions 21 and 22, respectively, of the links 15 and 16. These pivot portions are flattened to enable them to be inserted through restricted openings 23 and 24, respectively, leading to the eyes 19 and 20, the larger diameter of the pivot portion being greater than the width of the restricted opening and substantially equal to the diameter of the eyes and the smaller diameter of the pivot portions being less than the width of the restricted openings to permit them to be inserted through said openings to engage the eyes. After the pivot portions are in place and the links are in their working position the pivot portion cannot escape from the eyes. The brake head is provided with an eye 25 and a restricted opening 26 leading into said eye and the link 15 is provided with a reduced pivot portion 27 journaled in the eye 25, the connection being effected by turning the brake head until the flat portion will pass through the opening 26 into the eye 25 after which the brake head is turned to working position in which position the pivot portion 27 cannot escape from the eye. The other link 16 is connected to the brake head by means of a pin 28 extending through registering openings in the link and brake head, split pins 29 being provided to hold the pin 28 in place. The parallel links 15—16 keep the brake head from tipping or tilting as it is moved by the brake beam 12 toward and from the car wheel. The links 15—16 may be forgings, the pivot portions 21, 22 and 27 being formed integral with the links whereby a durable and safe construction is obtained.

Having thus described my invention what I claim as new and desire to secure by Letters Patent is:—

A brake construction, comprising a brake head, and means for supporting said brake head for swinging movement comprising two substantially parallel links, the upper end of each link having a flattened pivot portion, and a supporting bracket for said links having two bearing openings for said pivot portions, and restricted slots leading to said bearing openings, and open on opposite sides of said bracket.

In witness whereof, I have hereunto subscribed my name in the presence of two witnesses.

ALFRED COPONY.

Witnesses:
  I. N. CLARK,
  M. W. SWETMAN.